Inventor:
Alfred Herman Koppensteiner
By Griffin and Branigan
Attys

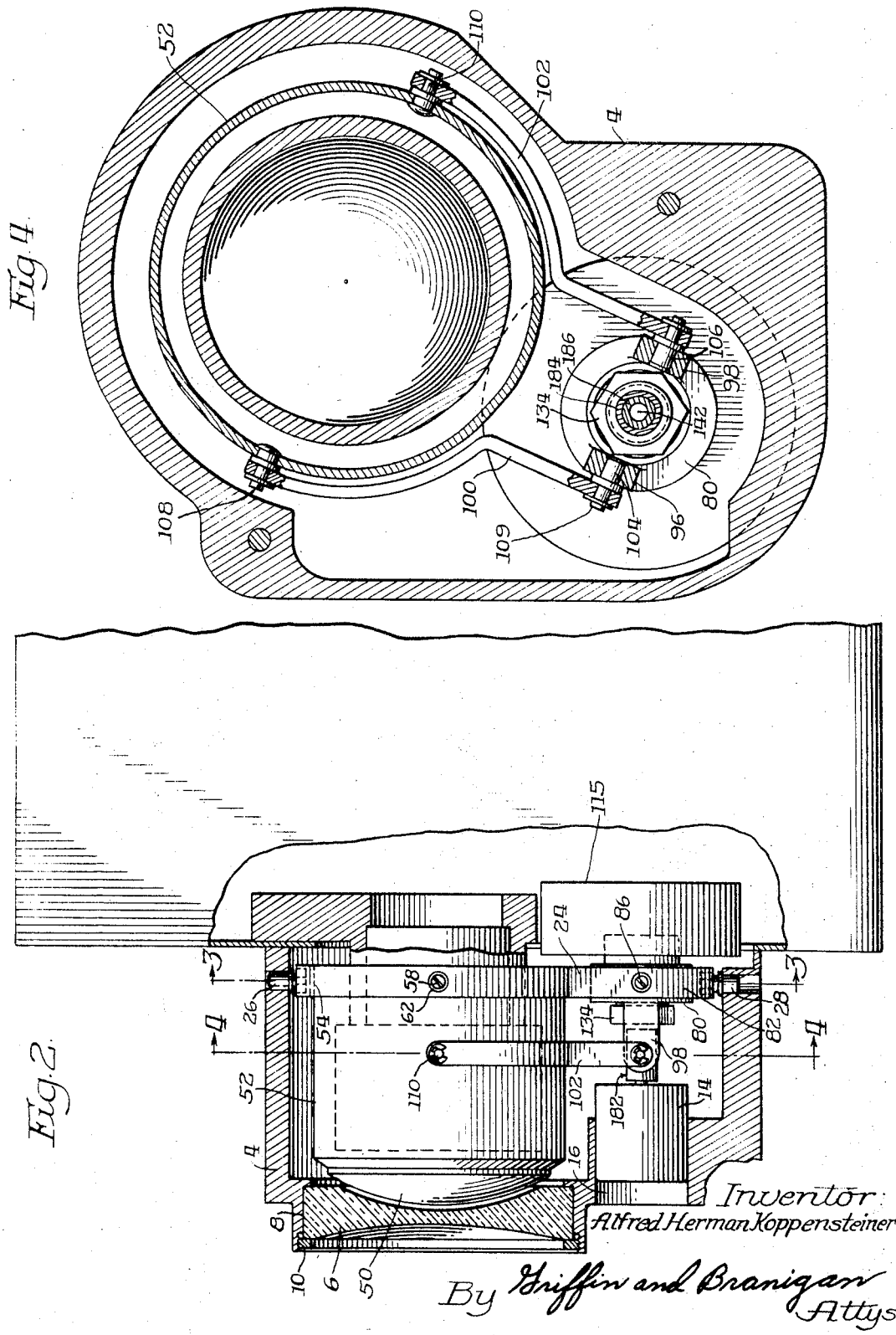

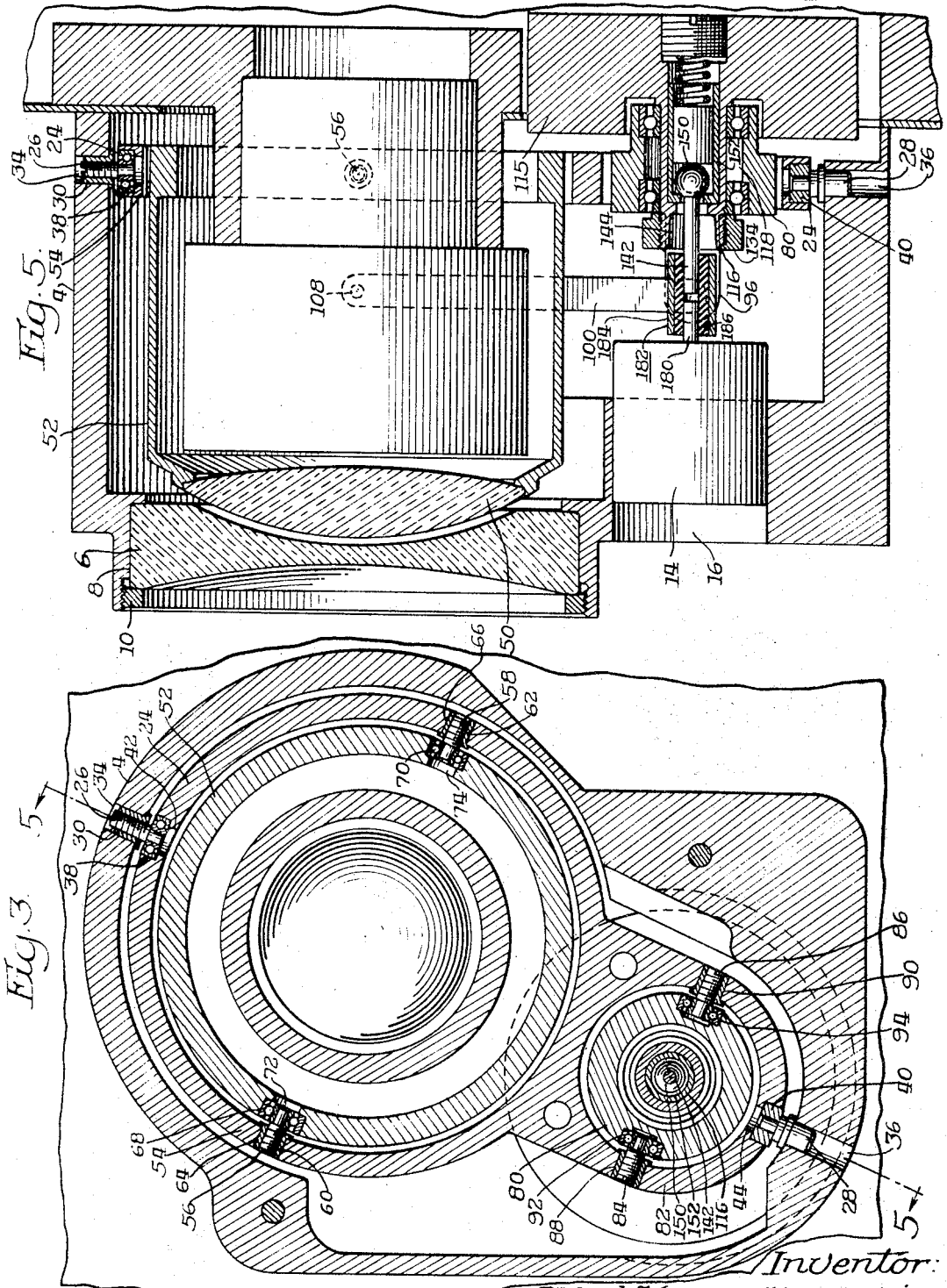

Inventor:
Alfred Herman Koppensteiner
By Griffin and Branigan
Attys

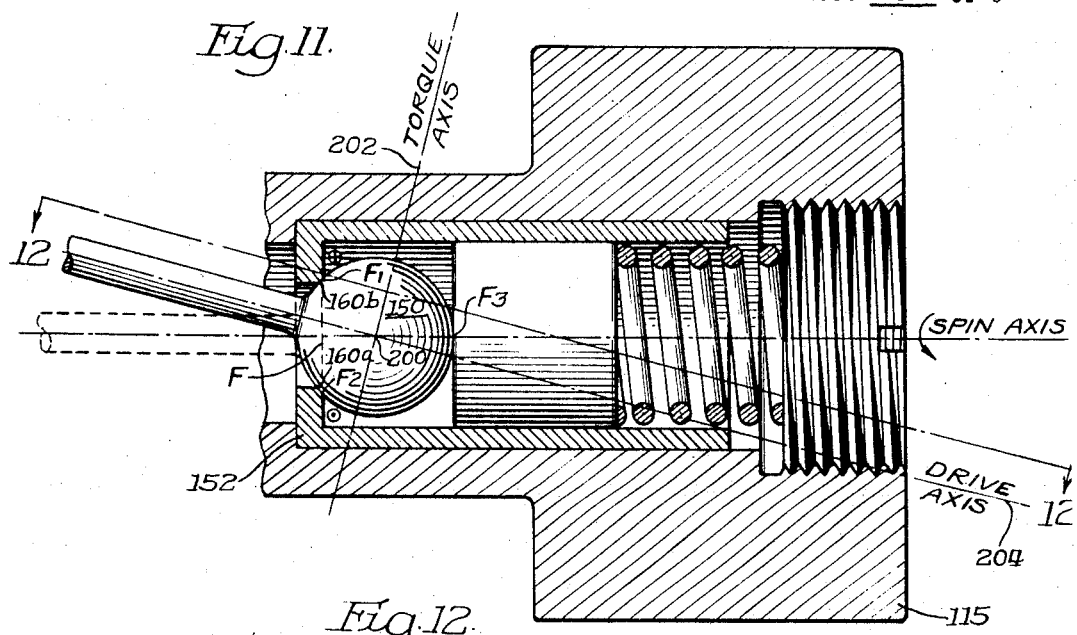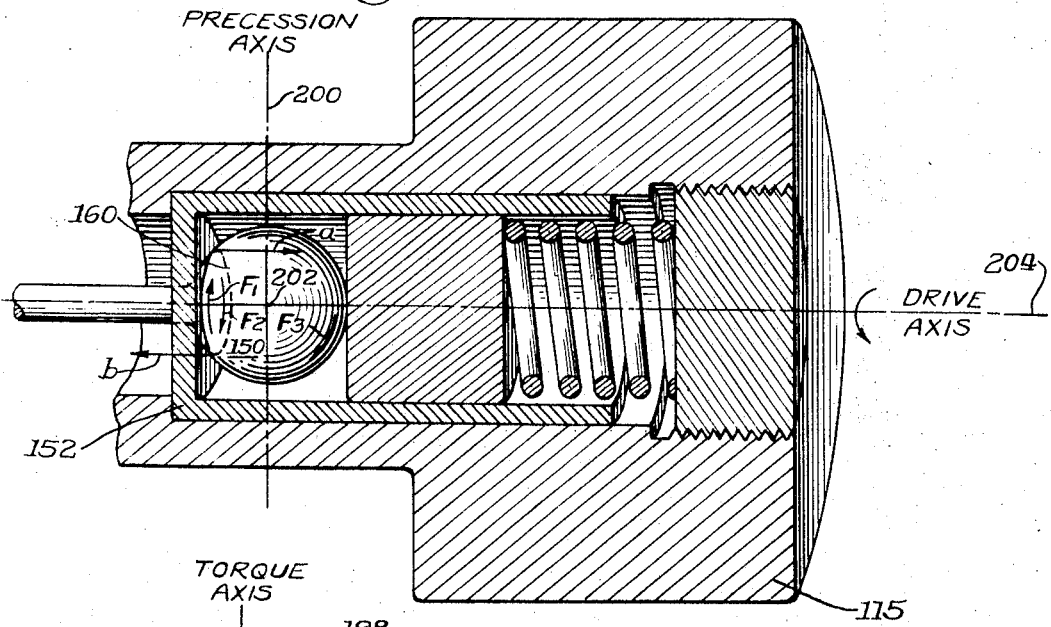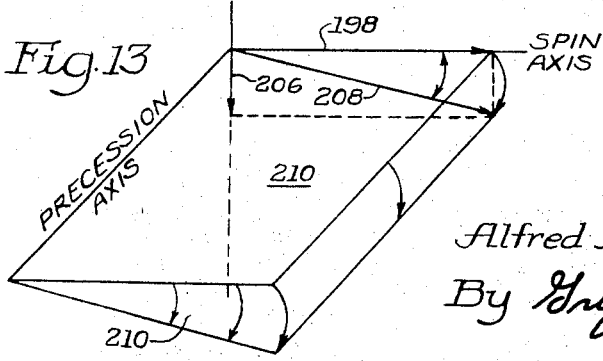

United States Patent Office 3,424,521
Patented Jan. 28, 1969

3,424,521
STABILIZED OFFSET LENS SYSTEM
Alfred H. Koppensteiner, Torrance, Calif., assignor to Bell & Howell Company, Chicago, Ill., a corporation of Illinois
Filed Sept. 7, 1965, Ser. No. 485,456
U.S. Cl. 352—140  10 Claims
Int. Cl. G03b 3/10

ABSTRACT OF THE DISCLOSURE

A rotor is mounted on a spherical drive means so that the spin axis of the rotor is free to pivot about a point on the drive axis of the drive means. A transfer member is mounted so that it follows the motion of the rotor about the pivot point on the drive axis, but is stationary with respect to the rotor's rotation about its spin axis. A lens to be stabilized is suspended within a housing by a gimbal suspension system so that the lens' axis is offset from the rotor's spin axis. The gimbal suspension system is in turn coupled to the transfer member so that the lens follows the motion of the rotor about its pivot point on the drive axis, but at an axis offset from the rotor's spin axis. The stabilized lens is mounted adjacent a lens of an optical instrument to form a Boscovich type of wedge, so that the image at the focal plane of the wedge remains stable even though the instrument housing is subjected to undesirable vibrations.

---

This invention relates to stabilized optical systems and more particularly to a mechanism for stabilizing the lenses of cameras, telescopes, field glasses, or other optical instruments against vibratory motions.

Whether optical instruments are hand held or mounted upon a platform which is subjected to vibratory motion, the lenses thereof are generally unavoidably vibrated, thereby resulting in an undesirable image at the focal plane. This is particularly true in the case of a movie camera where vibrations are recorded on successive frames of film which, when magnified during projection, produce a picture which is unpleasant to view and in some instances unintelligible. It is an object of this invention, therefore, to provide a lens stabilization system wherein undesired vibrations are eliminated from the image at the instrument's focal plane, whether they be caused by an operator or a vibrating platform.

It is a more particular object of the invention to provide a movie camera that will produce a stable, non-vibratory picture whether the photographer takes pictures while walking, riding in a car, or even flying in an aircraft in which case the camera is subjected to both severe aircraft vibrations as well as the normal jiggle introduced by the photographer. The invention, however, is not limited to the field of hand held movie cameras. It also has great utility in other fields such as military optical instruments. For example, the Navy has refrained from using high powered binoculars because the users thereof have been unable to hold the binoculars sufficiently stable to focus upon the object which it is desired to view. The Naval forces have even been unable to make full use of the recent developments in the area of telescopic zoom lenses. Again, this is because the users have been unable to focus on the desired object during high zoom lens magnification. This is so even when the binocular or telescope is not hand held, but rather is fastened to a bracket rigidly mounted to the ship, for example.

The invention also has wide use in the field of aerial photography where stabilized moving pictures are rare indeed. Similarly, ground monitored visual guidance systems for missiles have generally proved ineffective because the image received by the ground monitoring station has been too unstable for an operator to accurately detect a target. The system of the invention remedies this situation. In addition, the invention has great utility for use in observational devices currently being used by the Army in tactical and reconnaissance aircraft. For example, the Army has recently experienced difficulties with its helicopter gunners losing sight of a target as soon as the guns are fired. That is, the vibrations from the guns cause related optical sighting systems to jiggle so much that the operator cannot focus on the target. In fact, it is for this reason that many land based anti-aircraft weapons have the sighting systems thereof sufficiently removed from the gun mounting that the gun vibrations do not interfere with the optical sighting mechanisms. By using an optical stabilization system in accordance with the instant invention an operator's ability to visually focus on a desired object is not impeded by platform vibrations. Hence, the sighting mechanism can be located at the gun mount.

One means for accomplishing this is to use the lens itself as a rotor of a gyroscope. That is, the lens that it is desired to stabilize is rapidly spun about its optical axis so that its angular momentum permits it to resist vibratory motion away from its spin axis. In this manner the lens is stabilized. This type of device, although quite suitable in most of its applications, has certain drawbacks which limit its use. For example, in some instances when the optical instrument with which it is associated is subject to very large amplitude vibrations the stabilized lens has a tendency to nutate. Consequently, it is an object of this invention to provide a lens stabilization system where the stabilized lens is substantially free from nutational tendencies.

It is another object of this invention to provide a lens stabilization system which not only compensates for instrument vibrations but is also of the "self-erecting" type. That is, the device has a characteristic that the rotor's spin axis will automatically follow and strive steadily to align itself with the axis of its driving member so that the lens always tends to become aligned with the instrument. This erection is accomplished by a precessional torque, the magnitude of which increases as the deviation of the spin axis from the driving axis increases.

In the past, stabilized optical systems have been suggested wherein one lens of an optical wedge is stabilized by connecting it through a rigid connection to a gyroscope housing. It has also been suggested that by mounting the gyroscope within an instrument housing, for example, so that the optical wedge comprises a portion of the instrument's objective lens, that the instrument's image can be stabilized against accidental displacements. In this case, however, the gyro rotor, its driving mechanism, and the optical wedge are all lined up along a single axis. Consequently, the resulting structure becomes so large and cumbersome that it is impractical to use, especially in the case of hand held optical instruments such as movie cameras. It is a primary object of this invention therefore, to provide a lens stabilization system which is sufficiently small and compact to be used in small optical instruments, especially those of the hand held type.

In accordance with the principle of the invention, a rotor is driven by a drive means about a spin axis, the rotor being mounted with respect to the drive means so that its spin axis is free to pivot about a point on the drive axis of the drive means. A transfer member is mounted with respect to the rotor so that it follows the motion of said rotor about the pivot point on the drive axis, but is stationary with respect to the rotor's rotation about its spin axis. A lens to be stabilized is suspended within the instrument's housing by a gimbal suspension system so that the lens' axis is offset from the rotor's spin axis. The gimbal suspension system is in turn coupled to the transfer member so that the lens follows the motion of the rotor about its pivot point on the drive axis, but at an axis offset from the rotor's spin axis. In this manner, because the stabilized lens is able to be offset from the spin axis of the rotor, the lens stabilization system is not only made very compact, but it is readily adaptable to present day optical instruments. That is, by offsetting the rotor from the axis of the stabilized lens it does not interfere with the optical structure of most current instruments. By providing a lens stabilization system where the rotor may be offset from the axis of the stabilized lens, therefore, the stabilized lens may be incorporated into the optical structure of current devices without requiring major modification of those devices.

By mounting a mating lens with the stabilized lens so as to form a Boscovich type of wedge, an image viewed through the wedge and an associated focusing lens remains stable at the focal plane of the focusing lens irrespective of relative motion between the wedge elements. A wedge of this type is more fully described and explained in U.S. Patent 2,180,217 entilted "Camera with Range Finder" and issued to Carl Ort on Nov. 14, 1939. In this manner, the image at the focal plane remains stable even though the housing of the optical instrument is subjected to undesirable vibrations. Moreover, even when the instrument is panned relatively slowly the stabilized lens structure, by virtue of the rotor's precessive ability, is adapted to have the image of the thusly panned subject appear stably at the instrument's focal plane.

An advantage of the instant invention is that it is a relatively simple device which is susceptible to having large tolerances and is therefore capable of being manufactured at low cost.

A movie camera is perhaps the most common type of optical device wherein instrument vibration will defeat the purposes for which the instrument is intended. For this reason, although it is suitable for use in a wide variety of instruments, a preferred embodiment of the invention will herein be illustrated as being used in combination with a movie camera.

The foregoing and other objects, features, and advantages of the invention will be apparent from the following more particular description of preferred embodiments thereof, as illustrated in the accompanying drawings wherein the same reference numerals refer to the same parts throughout the various views. The drawings are not necessarily intended to be to scale, but rather are presented so as to illustrate the principles of the invention in clear form.

In the drawings:

FIG. 2 is a side view of a lens stabilization device embodying the invention;

FIG. 3 is a sectional view of the embodiment of the invention illustrated in FIG. 2 taken along the lines 3—3 thereof;

FIG. 4 is a sectional view of the embodiment of the invention illustrated in FIG. 2 taken along the lines 4—4 thereof;

FIG. 5 is a sectional view of the embodiment of the invention illustrated in FIG. 3 taken along the lines 5—5 thereof;

FIG. 11 is a schematic illustration of the frictional forces upon the spherical erecting ball of FIGS. 5 and 6 when viewed from the side at a time when the drive axis of the erecting sphere is moved out of alignment with the spin axis of the rotor;

FIG. 12 is a schematic illustration of the frictional forces upon the erecting sphere of FIGS. 5 and 6 when viewed along the lines 12—12 in FIG. 11 also at a time when the drive axis of the erecting sphere is moved out of alignment with the spin axis of the rotor;

FIG. 13 is a vector diagram illustrating the precessive action of the rotor whereby it erects itself into alignment with the drive axis of the erecting sphere.

Figure 1:
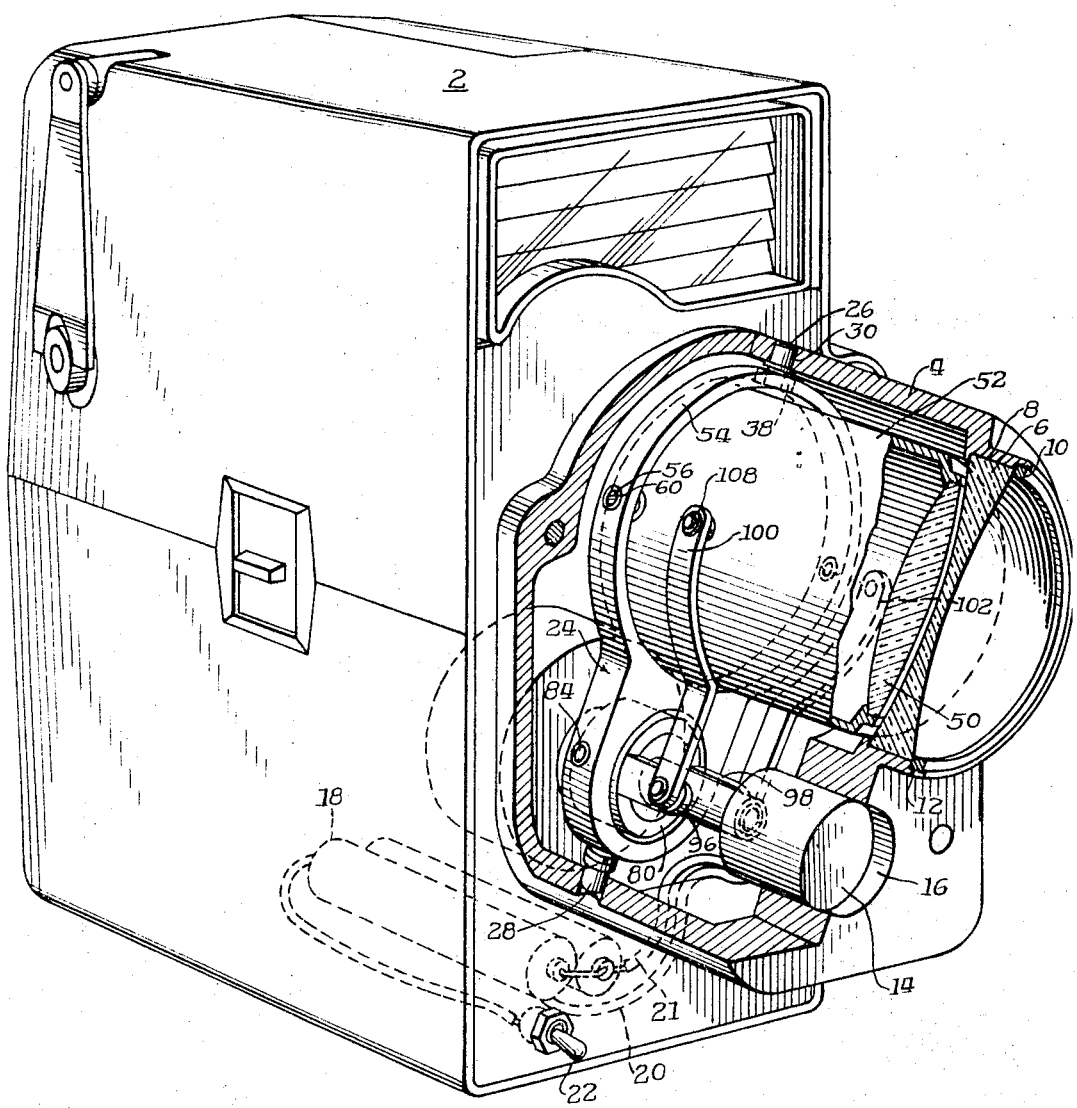
FIG. 1 is a perspective view of a camera, partially broken away to illustrate the incorporation therein of a preferred embodiment of the invention.

Referring to the drawings, a preferred embodiment of the invention will now be described. A camera 2 has a portion of the housing 4 thereof extending to the right in FIG. 1. A lens 6 is retained in a recess 8 of the housing 4 by means of a retaining ring 10 which is threadably engaged with a mating portion 12 of the recess 8. A DC motor 14 is retained in an aperture 16 (FIG. 2) in the lower portion of the camera housing 4 and receives its power by means of batteries 18 through leads 20 and 21 the former of which passes through a switch 22.

A double gimbal ring 24 is pivotally mounted in the housing 4 for rotation about an axis defined by a pair of gimbal pins 26 and 28. As is best shown in FIG. 3, the gimbal pins 26 and 28 are fastened to upper and lower portions of the housing 4 by any convenient means such as a threaded sleeve insert 30 which is pressed into receptables 34 and 36 of the housing. The other ends of the gimbal pins 26 and 28 are fastened to inner races of bearing assemblies 38 and 40, the outer races of which are pressed into receptacles 42 and 44 in the double gimbal ring which are in axial alignment with housing receptacles 34 and 36. In this manner, the double gimbal ring is adapted to pivot about the axis defined by the gimbal pins 26 and 28. It will be appreciated that although the double gimbal ring is illustrated as being pivotable about an axis off of the vertical, that the inclined mounting is merely for convenience and that the double gimbal ring can pivot about a differently inclined axis or even about the vertical without departing from the spirit and scope of the invention.

A stabilized lens 50 (FIGS. 2 and 5) is mounted by any suitable means on a support member 52 which is illustrated herein as being substantially cylindrical, but is not necessarily so. The lens support member is pivotally mounted in upper ring 54 of the double gimbal ring 24 for rotation about an axis defined by gimbal pins 56 and 58 (FIG. 3). The gimbal pins 56 and 58 have one end thereof threadably fastened to correspondingly threaded sleeves 60 and 62 which are pressed into receptacles 64 and 66, respectively, of the double gimbal ring's upper ring 54. The other ends of the gimbal pins 56 and 58 are fastened to inner races of bearing assemblies 68 and 70, the outer races of which are pressed into receptacles 72 and 74 of the lens support member 52. In this manner, the lens support member is pivotable about the axis defined by the gimbal pins 56 and 58. Moreover, as is most apparent in FIG. 3 the lens support member is also pivotable, by virtue of its connection to the double gimbal ring, about the axis defined by the gimbal pins 26 and 28. As was similarly noted above, it will be apparent that although the gimbal pins 56 and 58 define an axis illustrated as being inclined from the horizontal, they could also be located on the horizontal or at some other inclination therefrom.

A transfer member 80 is pivotally mounted in the double gimbal ring's lower ring 82 for rotation about an axis defined by gimbal pins 84 and 86. These gimbal pins are mounted by means of threaded sleeves 88 and 90 and bearing assemblies 92 and 94 in the same manner as was described in connection with the previously discussed gimbal pin mountings. In this case, however, although the axis defined by gimbal pins 84 and 86 may be either on the horizontal or inclined at some angle therefrom, that axis should be substantially parallel to the axis defined by gimbal pins 56 and 58 as will become apparent shortly.

The transfer member 80 has two arms 96 and 98 extending outwardly therefrom as is best shown in FIGS. 1 and 4. A pair of transfer yoke arms 100 and 102 are pinned at their lower ends in FIG. 4 to the transfer arms 96 and 98 by means of suitably mounted pin assemblies 104 and 106, respectively. At their upper ends the yoke arms are suitably pinned by pin assemblies 108 and 110 to the lens support member. In this manner, as the transfer member 80 pivots upwardly and downwardly in FIG. 1 about the axis defined by gimbal pins 84 and 86 its motion is transferred through the transfer arms and the yoke arms to the lens support member. Consequently, the lens support member 52 pivots about pins 56 and 58 to the same extent that the transfer member pivots about pins 84 and 86. In addition, the lens support member pivots about gimbal pins 26 and 28 to the same extent that the transfer member 80 pivots about the axis defined by those pins. Hence, the lens support member 52 follows both the pitching and yawing motions of the transfer member 80.

Figure 6:
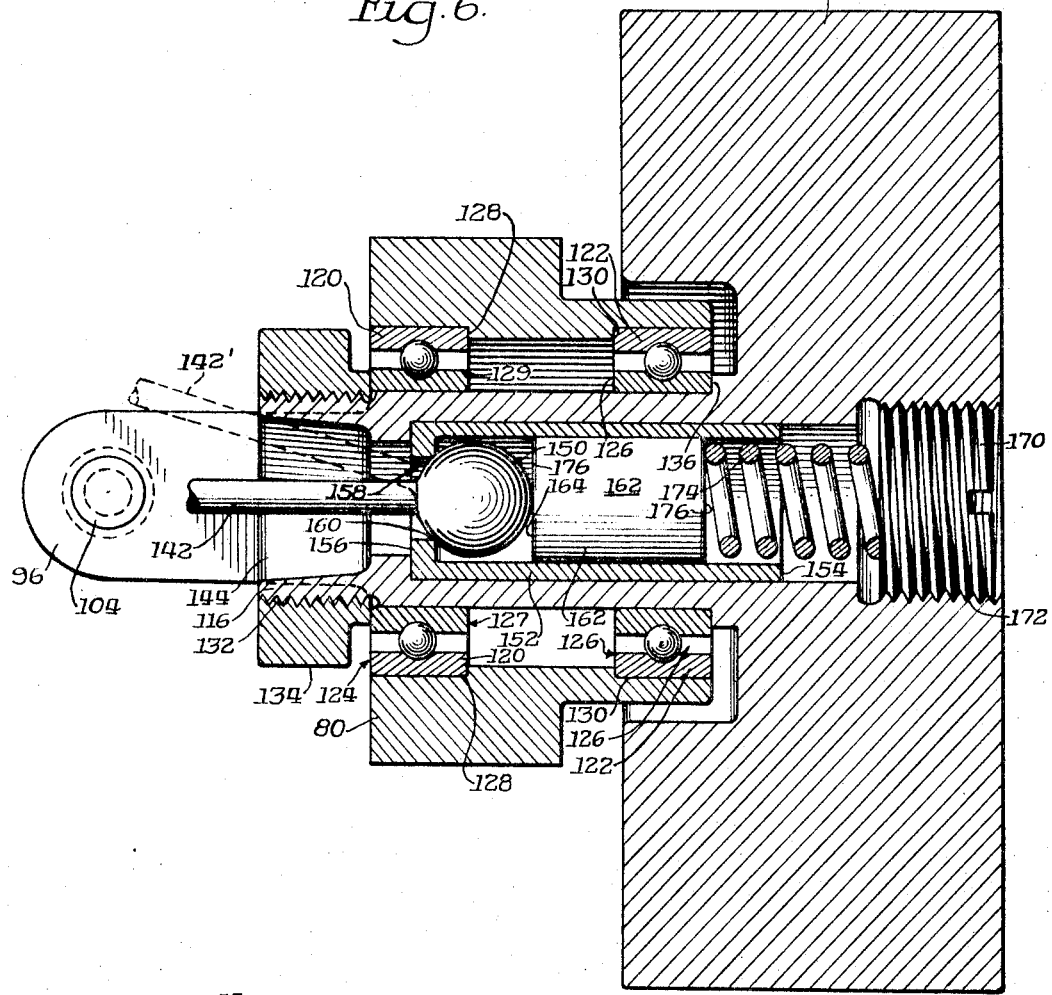
FIG. 6 is an enlarged fragmentary sectional view of the friction erection mechanism substantially as shown in FIG. 5.

Referring now to FIGS. 5 and 6, a rotor 115 has a support arm 116 thereof extending to the left through a central opening 118 in the transfer member 80. The outer races 120 and 122 of bearing assemblies 124 and 126 (FIG. 6) are pressed into recesses 128 and 130 of the transfer member 80, respectively. The inner races of the bearing assemblies 124 and 126 are pressed onto the support arm 116. As is best shown in FIG. 6 the left end of the support arm is threaded at 132 to receive a retaining nut 134. The retaining nut is fastened so that it and a shoulder 136 on the rotor 115 are snugged up against the inner races of the bearing assemblies 124 and 126, respectively. The rotor therefore is rotatable about an axis through the center of the transfer member. Moreover, because the rotor is fastened to the transfer member 80 any pitching motion of the rotor's spin axis is transmitted through the transfer arms 96 and 98 and the transfer yoke arms 100 and 102 to the lens support member 52. Similarly, any yawing motion of the rotor's spin axis is transmitted to the lens support member by means of the three sets of gimbal pins 84–86, 26–28, and 56–68. Hence, the lens 50 follows the relative pitching and yawing motion of the rotor 115. In addition, the rotor functions to counterbalance the weight of the lens and its support member about the gimbal axis.

In FIGS. 5 and 6 a drive shaft 142 extends from the left into a relatively wide central opening 144 of the rotor support arm 116. A driving sphere 150 is mounted on the end of the drive shaft 142 in the center of the rotor support arm's central opening and has its center substantially in the plane defined by the above described gimbal pins. The rotor support arm's central opening is lined by a sleeve member 152 which is open at its right end 154 in FIG. 6, but closed at its left end 156 except for an aperture 158 for generously accommodating the shaft 142. In this manner, the shaft is free to move relative to the sleeve's axis into a position, for example, such as its phantom position 142'. The aperture 158 has an inner circle of contact 160 with the driving sphere 150. A plug 162 is located within the sleeve 152 and has a substantially flat end 164 thereof in substantially point contact with the driving sphere 150. A threaded plug member 170 is inserted into a correspondingly threaded recess 172 located about the axis of the rotor 115. A spring 174 is also partially located within the sleeve 154. The left end of the spring 174 bears against the right end 176 of the plug 162 and urges the plug's flat end 164 into its point contact engagement with the sphere 150. The force of the plug 162 upon the sphere 150 in turn urges the left side of the sphere in FIG. 6 into engagement with the circle of contact 160 on the inner portion of the sleeve's aperture 158. The force exerted by the plug 162 upon the sphere 150 and hence the force exerted by the circle of contact 160 upon the sphere can be varied by adjusting the position of the threaded plug 170 to change the force of the spring 174.

Figure 7:
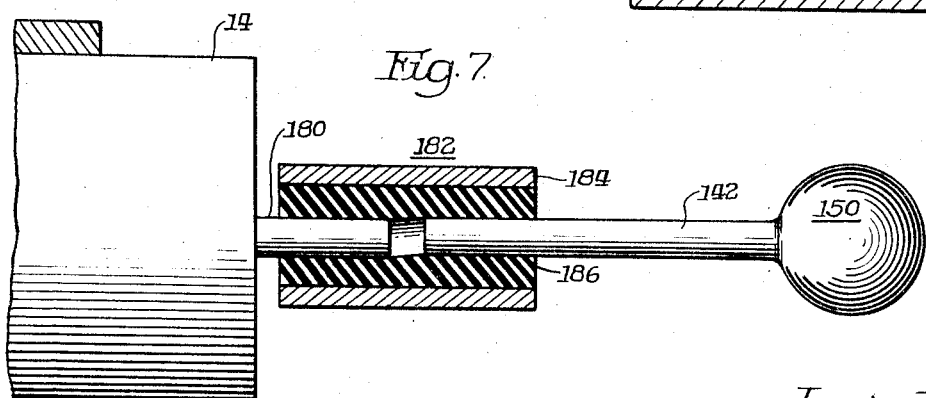
FIG. 7 is a sectional view illustrating a coupling device of FIG. 5 in more detail.

As shown in FIGS. 5 and 7 the output shaft 180 of the motor 14 is connected to the driving sphere's shaft 142 by means of a sleeve assembly 182. The sleeve assembly is comprised of a rigid outer member 184 such as, for example, a piece of steel tubing and an inner member 186 which is of a more resilient nature. The sleeve 186 surrounds the two shafts 180 and 142, but because of its resilient nature is adapted to "take-up" minor misalignment between the two shafts. The outer sleeve 184, on the other hand, because of its rigid nature prevents the shafts from wobbling with respect to each other when the shaft 142 is driven by the shaft 180 as will be described in more detail shortly.

The operation of the above described structure will now be briefly described after which will follow a more detailed description of the coactive relationships between the rotor, the driving sphere, and the stabilized lens. Briefly, the motor, powered by the batteries 18, drives the shaft 142 which extends out of the sleeve assembly 182. As the sphere 150 is in turn rotated by the shaft 142 the frictional forces between it and the circle of contact, cause the rotor to spin about its geometric axis within the transfer member's bearing assemblies 124 and 126. As the rotor spins it acts as a gyroscope and hence is stable in space about its spin axis. As the camera housing moves in space the shafts 180 and 142, and the sphere 150 move with it. The rotor, however, remains relatively stationary. This is represented in FIG. 6 where the shaft 142' has been pivoted so that its axis is no longer in alignment with the geometric or spin axis of the rotor 115.

Referring again to FIG. 2; although the rotor 115 actually remains relatively stable in space as the camera jiggles, with respect to the camera it appears as though the rotor moves. Consequently as the rotor 115 apparently pitches about the axis through the gimbal pin 86 its relative motion is transmitted through the transfer member 80 and the transfer yoke arm 102 to the lens support element and the stabilized lens, 52 and 50, respectively. Similarly, as the rotor apparently yaws about the axis through gimbal pins 26 and 28 the relative yawing motion is transmitted to the stabilized lens 50 through the double gimbel ring 24.

As previously noted the lens doublet comprised of lenses 6 and 50 forms an optical wedge. In this manner, parallel light rays entering the lens 6 exit from lens 50 in rays that are parallel but collectively divergent from the axis of the lens 6 by an amount corresponding to the divergence of lens 50's axis from the axis of lens 6. In other words, in FIG. 5 for example, if a horizontal light ray passing through the center of lens 6 normally strikes the center of the camera's focal plane, it continues to do so even through the lens 6 is declined off of the horizontal so long as the axis of lens 50 is aligned with the horizontal light ray.

Hence, because the lens 50 is held stable, light rays entering the lens wedge from the left in FIG. 5 are bent so as to be directed towards the camera's focusing lenses and focal plane irrespective of relative motion between the two lens elements.

It will be apparent from the above brief description that as the camera housing is subjected to vibrations the circle of contact 160 moves across the surface of the driving sphere 150 a distance determined by the amplitude of the vibrations. At the same time, the lenses 6 and 50 have their axes displaced from each other by a corresponding angle. As noted above, therefore, the light rays entering the camera are bent an amount corresponding to the vibrations to which the camera housing is subjected. In this manner, the image appearing at the camera's focal plane remains constant irrespective of external vibrations.

Figure 8:
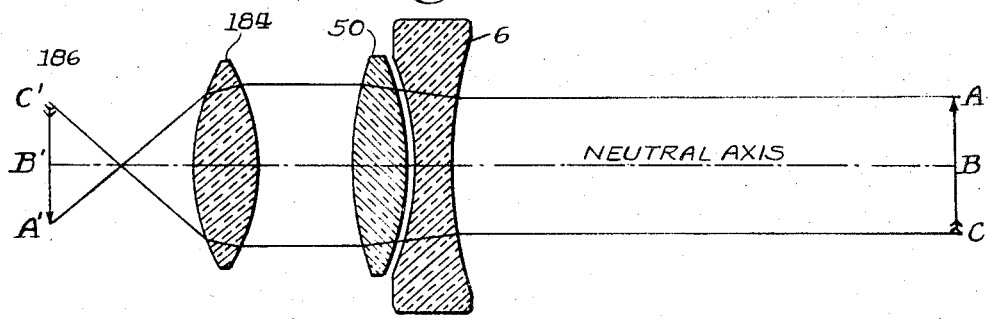
FIG. 8 is a schematic diagram of an image received at the focal plane of a camera as the camera views an object.

Having described the structure and mechanical operations of the invention, the optical operation of the above described preferred embodiment of the invention will now be described with reference to the schematics of FIGS. 8, 9, and 10. Turning first to FIG. 8, the arrow ABC represents an object which it is desired to photograph at a time when the lens stabilization system is in its neutral position and the drive axis of shaft 142 is superposed on the spin axis of the rotor in FIG. 6. At this time, light rays from the right in FIG. 8 pass through the lens elements 6 and 50, which form a Boscovich type of wedge, and after passing through a focusing lens 184 form an inverted image of the object A'B'C' at the focal plane 186 of the camera.

Figure 9:
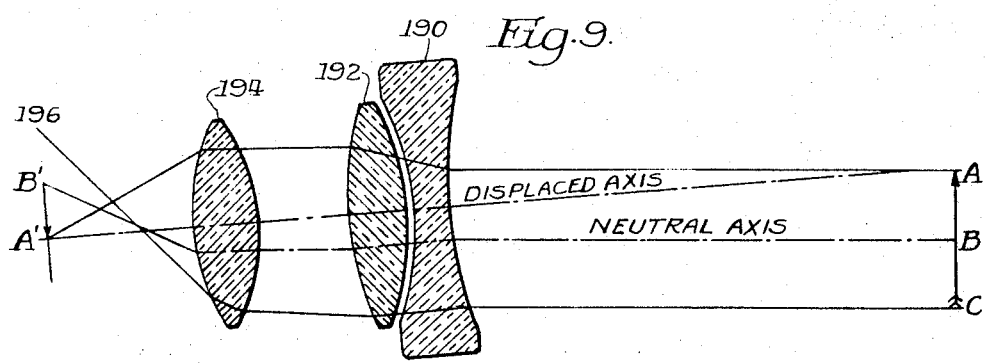
FIG. 9 is a schematic diagram illustrating the image that would be received by an unstabilized lens system when the camera of FIG. 8 is subjected to a vibration.

FIG. 9 shows corresponding lens elements 190 and 192 of a camera which does not have a stabilized optical system. The camera is shown as having been displaced off of its neutral axis such as, for example, occurs when a photographer holding a movie camera in his hand walks along the ground while photographing. The distance between the displaced axis and the neutral axis in the schematic, therefore, represents the amount of jiggle which is introduced by the photographer. In this case, the object which is desired to be photographed (arrow ABC) has only a portion of its image formed at the focal plane 196 of the camera having the unstabilized lens system. That is, only the AB portion of the object has an image thereof A'B' formed at the focal plane. The BC portions of the object are not photographed. This illustration corresponds to the often observed shortcoming of home movies wherein the photographer successively cuts off the feet and then the heads of persons whom he is photographing while walking towards them.

Figure 10:
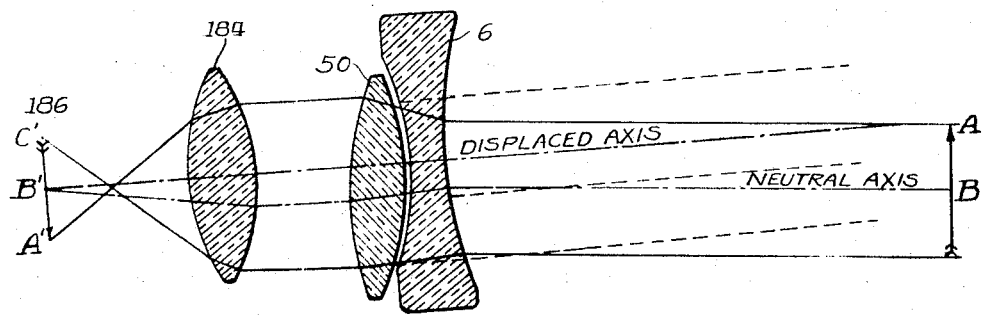
FIG. 10 is a schematic diagram of the image at the focal plane when a camera embodying the invention is subjected to a vibration.

FIG. 10 illustrates the operation of a camera employing the stabilized lens system of the instant invention. In this case, the photographer has moved the camera off of its neutral axis in the same manner that the camera was moved in connection with FIG. 9. In this case, however, the lens element 50 maintains its stability about the neutral axis which in this case is its spin axis. The lens elements 6 and 184, however, are displaced along with the camera housing as shown. With respect to the camera housing, therefore, the lens 6 is fixed, while the optical wedge's other lens 50 is relatively movable although stationary in space. For this reason, the entire image A'B'C' of the object ABC is placed upon the focal plane 186 of the camera just as though the camera had not been displaced. Thus, the lens stabilization system of the invention eliminates the photographic effect of undesired vibrations caused by the photographer. Moreover, even if the platform upon which the photographer is located is subjected to random vibrations in addition to those caused by the photographer the image at the focal plane of the camera will be further compensated whereby the undesired vibrations will not show up in the final photographs.

It will be appreciated by those skilled in the art that although the invention has been illustrated in connection with a movie camera wherein the vibrations were introduced by a photographer that a similar structure is easily incorporated into binoculars, telescopes, gunsights, or other optical instruments. Moreover, although the invention is particularly well suited for hand held optical instruments wherein weight and compactness are prime requisites the invention is not at all limited thereto. For example, the invention is equally applicable to ground controlled optically guided missile systems.

When a photographer takes pictures with a movie camera he frequently desires to obtain a panoramic view of a particular scene. Hence, he swings the camera through an arc about his body as an axis. This operation is normally referred to as "panning." If the user of a telescope pans too rapidly the fact is immediately apparent to him because his view is not what he would like it to be. Where the viewer intends his efforts to be used in a secondary manner, such as the direction of a gun barrel or the recording of a field of view on film, he is not so immediately aware of his error. In the case of a movie camera, for example, there is no correlation between the ability of the user's eye to adapt to a changing field of view and the ability of the film to record the changing field of view. Indicative of the seriousness of this matter is a recent estimate by a group of trade association members in the camera field that 80% of all home movies film spoilage results from the operator panning too rapidly. It can be appreciated, therefore, that the desire of a photographer to pan is very great. It is for this reason that the stabilized lens system of the instant invention is adapted so that the operator can pan the camera or other optical instrument and still receive the desired stable image at the camera's focal plane. This aspect of the invention will now be described.

The description of the invention thus far has been directed primarily to low amplitude, high frequency vibrations that are normally associated with the undesirable jiggle which is common in moving picture photographs for example. Panning, on the other hand represents an extremely high amplitude, low frequency vibration. So much so that it is not normally considered a vibration at all and clearly not an undesirable one. In order to permit panning, therefore, the stabilized lens system of the invention is adapted to erect itself so that its spin axis (the neutral axis in FIGS. 8–10) is very slowly brought into alignment with the displaced axes of the drive means. This is accomplished by the gyroscopic action of the above described rotor.

Gyroscopic action is the tendency of a rapidly spinning body to turn about a second axis not parallel to the axis of spin when acted upon by a torque about a third axis. Generally, the second axis is referred to as the precession axis and the third axis is referred to as a torque axis. Moreover, the rapidly spinning body tends to move in a direction which is perpendicular to the direction of the force which causes the torque. The reason that the spinning body moves perpendicularly to the direction of the force is because the angular momentum of the spinning body and the torque caused by the force acting upon the body resolve themselves in a direction perpendicular to the force. Hence, one way to determine the direction in which a spinning body will move when it is subjected to an outside force is to draw a vector diagram of the angular momentum of the body about its spin axis and the torque on the body caused by the force. The spin axis will move to line up with the torque axis giving rise to motion about the precession axis which is orthogonal to both the spin and torque axes.

In the instant case reference will be made to FIGS. 11 through 13 in describing the gyroscopic action of the invention whereby the rotor 115 is erected by means of the friction forces between the driving sphere 150 and the rotor's sleeve 152 at the circle of contact 160. Assume that the rotor is spinning in a counterclockwise direction when viewed from the right in FIG. 11. The driving sphere engages with the rotor's sleeve at the circle of contact 160 which includes the points 160a and 160b in FIG. 11. As previously noted, the frictional forces around the circle 160 cause the rotor to spin as a result of the rotation of the driving sphere. When the driving sphere is in its horizontal or neutral position (shown in phantom in FIG. 11), both the driving sphere and the motor rotate about the axis labelled spin axis in the figure. The driving sphere, however, is free to move off of the spin axis, at which time the circle of contact 160 swings across the spherical surface 150. The driving sphere is shown in its displaced position in FIG. 11. A position such as this would occur, for example, when the photographer attempts to pan an object such as the Washington monument starting at the bottom and going towards the top.

When the rotor is spinning its angular momentum causes it to maintain stability about the spin axis thereby resisting angular displacement. By laws of conservation of angular momentum the rotor will maintain its alignment with the spin axis in the absence of any outside forces. By the familiar right hand rule the angular momentum of the spinning rotor can be illustrated by the horizontal vector 198 pointing to the right in FIG. 13 along the spin axis. That is, the vector points in the direction a right hand screw would travel if rotated in the direction of the rotor. Vector 198 is referred to as the spin vector.

As the rotor is rotated in its counterclockwise direction there is a ring of frictional forces F which occur all along the circle of contact 160. At the point 160b this force, designated F1, is into the plane of the paper in FIG. 11 and represented by the conventional cross within a circle. The frictional force F2 which is exerted on the rotor at point 160a, on the other hand, is out of the paper and represented by the similarly conventional dot within a circle. In FIG. 11 the precession axis 200 is in the center which is the axis 202 in FIG. 11 substantially perpendicular of the figure and perpendicular to the plane of the paper. It is this axis about which the rotor will rotate in response to a force applied to the rotor about the torque axis lar to the drive axis 204. When the precession axis is viewed from above, that is when looking along the torque axis, it appears as a line which is shown is shown as the vertical line 200 in FIG. 12. In FIG. 12, however, the torque axis appears as a point extending into the plane of the paper.

Although all of the frictional forces about the ring of contact 160 are substantially equal, their respective distances from the torque axis are different. For example, the moment arm of force F1 about the torque axis 202 in FIG. 12 is greater than the moment arm of force F2 about the torque axis. Hence, the torque about the torque axis due to F1 is greater than the torque about the torque axis due to F2. The resultant torque about the torque axis, therefore, is in the direction of F1 which is clockwise in FIG. 12. A similar analysis can be performed for the other frictional forces around the circle of contact. In addition, these frictional forces also have a component which would appear to slide across the sphere's surface when the drive axis is inclined as in FIGS. 11 and 12. These sliding frictional forces are represented by vectors $a$ and $b$ in FIG. 12 and are at right angles to the ring of contact 160. These forces act along the surface of the sphere and move back and forth with each revolution of the sphere 150. It is the totality of all of the above described frictional forces that causes the torque which leads to erection of the rotor.

By using the right hand rule the torque due to the friction forces (F1 and F2 as well as vectors $a$ and $b$, for example) is represented by a vector 206 in FIG. 13. It is this friction torque that acts as the outside force to move the rotor off of its spin axis. This is easily shown in FIG. 13 by noting the direction in which the spin vector must move in attempting to line up with the torque vector. Hence, the direction of precession of the rotor in FIGS. 11 and 13 is in a clockwise direction as illustrated by the schematic wedge shaped element 210 in FIG. 13.

It can be seen, therefore, that when the axis of the driving sphere is moved off of the rotor's spin axis the frictional forces upon spherical surface 150 cause the rotor to precess until it has erected itself. When the rotor is erected so that the spin axis is in alignment with the drive axis there will be no more differential in the moment arms of the various friction forces; nor will there be any more sliding. Consequently, there is no resulting torque about the torque axis and precession ceases. It should be appreciated, however, that this friction erection is a relatively slow process as compared with the frequency of the undesired vibrations which have been previously discussed. Consequently, although the lens system of the invention follows the relatively slow panning motion by a photographer, any undesired vibrations occurring during this panning are effectively filtered out, whereby only the desired motion is recorded on the film.

Returning now to FIG. 6, another aspect of the invention will be discussed wherein the angular velocity of the lens system's friction erection can be varied. As previously noted, the frictional forces between the driving sphere and the circle of contact on the rotor's sleeve can be varied by altering the position of the threaded plug 170 in the end of the rotor 115. In this manner, the forces of the spring 174 against plug 176 are increased. From the above analysis of friction erection, and remembering that the precessional velocity increases with the amount of torque about the torque axis, it will be apparent that the precessional velocity of the rotor is easily varied merely by moving the threaded plug inwardly or outwardly in FIG. 6. That is, when the plug is moved to the left in FIG. 6 the spring force becomes greater. Hence, when the instrument is panned so that the axis of the driving sphere becomes displaced from the spin axis of the rotor the frictional forces causing erection are greater and erection occurs at a faster rate. Consequently, if it is desired to pan the instrument more rapidly it is merely necessary to tighten down on the plug 170, whereby the stabilized lens 50 will more rapidly follow the motion of the lens element 6.

The invention has been described in terms of the rotor's sleeve having substantially circular contact with the surface of the driving sphere. It will be appreciated, however, that wider contact over a greater portion of the driving sphere's surface is within the scope of the invention. For example, so long as the contact is not so great that the rotor's sleeve cannot move over the driving sphere's surface, the contact portion may be spherical.

Moreover, it will be appreciated that although a spherical element is contemplated for use in connection with the friction erection aspects of the invention it is not necessary that the same spherical element be used to drive the rotor about its spin axis. For example, the rotor could also be driven by rotating magnetic fields or pneumatic drive means.

For ease of illustration the action of the above structure has been described in connection with panning and vibration in a vertical plane. However, it will be understood that the invention disclosed herein works equally well when the motion resulting from either panning or vibration has only a horizontal component or has both a vertical and a horizontal component.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. In a device having a lens stabilization system, the combination comprising:
   a housing;
   a gimbal ring mounted within said housing for pivotal motion relative to a first motion axis;
   drive means mounted within said housing and rotatable about a drive axis;
   a spatially stabilized rotor mounted on said drive means so as to be spun about a spin axis by said drive means, said rotor being adapted so that its spin axis is free to diverge from said drive axis by pivoting with respect to both said first motion axis and a second motion axis, said motion axes intersecting at a point on said drive axis, said drive means including a spherical surface having its center of curvature at the intersection of said motion axes with said drive axis;
   a transfer member mounted coaxially with said spin axis of said rotor and adapted to move with said rotor as said rotor pivots with respect to said first and second motion axes;

first connecting means for connecting said transfer member to said gimbal ring so that motion of said rotor with respect to said first motion axis is transferred to said gimbal ring whereby said motion of said gimbal ring relative to said first motion axis corresponds to motion of said rotor relative to said first motion axis;

a lens support member pivotally mounted on said gimbal ring for motion about an axis parallel to said second motion axis;

a lens mounted on said lens support member; so that the axis of said lens is offset from said spin axis of said rotor, said lens support member being mounted on said gimbal ring so that said lens support member moves with said gimbal ring relative to said first motion axis whereby motion of said lens support member and thereby said lens corresponds to motion of said rotor relative to said first motion axis; and second connecting means for connecting said transfer member to said lens support member so that motion of said rotor relative to said second motion axis is transferred to said lens support member to cause motion of said lens support member about said parallel axis corresponding to motion of said rotor about said second motion axis, whereby motion of said lens corresponds to motion of said rotor so that said lens is spatially stabilized to substantially the same extent as said rotor.

2. The apparatus of claim 1 wherein said parallel axis intersects said first motion axis and the stabilized lens is mounted on said support means so that the center of curvature of said stabilized lens is at the intersection of said parallel axis with said first motion axis.

3. The apparatus of claim 1 including:
an erecting means on said rotor in frictional contact with said spherical surface so that the frictional forces between said erecting means and said spherical surface cause said spin axis to tend to be superposed on said drive axis.

4. The apparatus of claim 3 wherein said parallel axis intersects said first motion axis and the stabilized lens is located on said lens support member so that the center of curvature of said stabilized lens is located at the intersection of said parallel axis with said first motion axis.

5. The apparatus of claim 1 including a second lens mounted in said housing coaxially with said stabilized lens so that said stabilized lens and said second lens form an optical wedge.

6. The apparatus of claim 5 including:
an erecting means on said rotor in frictional contact with said spherical surface so that the frictional forces between said erecting means and said spherical surface cause said spin axis to tend to be superposed on said drive axis.

7. The apparatus of claim 5 wherein the spatially stabilized lens is mounted on said lens support member so that the center of curvature of said spatially stabilized lens is located at the intersection of said first motion axis with said parallel axis.

8. In a moving picture camera which is adapted to focus light rays from an object onto a film station, the combination comprising:
a camera housing which includes an object portion and an image portion;
a fixed lens mounted in said object portion of said housing, said film station being at said image portion of said housing;
a gimbal ring mounted within said housing for pivotal motion relative to a first motion axis;
drive means mounted within said housing and rotatable about a drive axis;
a spatially stabilized rotor mounted on said drive means so as to be spun about a spin axis by said drive means, said rotor being adapted so that its spin axis is free to diverge from said drive axis by pivoting with respect to both said first motion axis and a second motion axis, said motion axes intersecting at a point on said drive axis, said drive means including a spherical surface having its center of curvature at the intersection of said motion axes with said drive axis;

a transfer member mounted coaxially with said spin axis of said rotor and adapted to move with said rotor as said rotor pivots with respect to said first and second motion axes;

first connecting means for connecting said transfer member to said gimbal ring so that motion of said rotor with respect to said first motion axis is transferred to said gimbal ring whereby motion of said gimbal ring relative to said first motion axis corresponds to motion of said rotor relative to said first motion axis;

a lens support member pivotally mounted on said gimbal ring for motion about an axis parallel to said second motion axis;

a spatially stabilized lens mounted on said lens support member so that the axis of said spatially stabilized lens is offset from said spin axis of said rotor, said spatially stabilized lens being located within said camera housing so that said spatially stabilized lens and said fixed lens form an optical wedge whereby an image from an object may be directed toward said film station irrespective of relative motion between said lenses, said lens support member being mounted on said gimbal ring so that said lens support member moves with said gimbal ring relative to said first motion axis whereby motion of said lens support member and thereby said stabilized lens corresponds to motion of said rotor relative to said first motion axis; and second connecting means for connecting said transfer member of said lens support member so that motion of said rotor relative to said second motion axis is transferred to said lens support member to cause motion of said lens support member about said parallel axis corresponding to motion of said rotor about said second motion axis, whereby motion of said stabilized lens corresponds to motion of said rotor so that the spatially stabilized lens is stabilized to substantially the same extent as said rotor.

9. The apparatus of claim 8 including:
an erecting means on said rotor in frictional contact with said spherical surface whereby the frictional forces between said erecting means and said spherical surface cause said spin axis to tend to be superposed on said drive axis.

10. The apparatus of claim 8 wherein said spatially stabilized lens is located on said lens support member so that the center of curvature of said spatially stabilized lens is located at the intersection of said parallel axis with said first motion axis.

References Cited

UNITED STATES PATENTS

| 1,402,064 | 1/1922 | Gray. |
| 1,634,950 | 7/1927 | Lucian. |
| 1,860,230 | 5/1932 | Brown. |
| 3,035,477 | 5/1962 | Ten Bosch et al. 88—1 |

FOREIGN PATENTS 234,155   1/1945   Switzerland.

JULIA E. COINER, *Primary Examiner.*

U.S. Cl. X.R.

95—12.5; 350—16; 352—244